United States Patent [19]
Shimojo et al.

[11] Patent Number: 6,011,102
[45] Date of Patent: Jan. 4, 2000

[54] POLYPROPYLENE-BASED RESIN COMPOSITION AND INJECTION MOLDED ARTICLE THEREOF

[75] Inventors: Moriyasu Shimojo; Shin-ichi Kondo, both of Ichihara, Japan

[73] Assignees: Toyota Jidosha Kabushiki Kaisha, Toyota; Sumitomo Chemical Company, Ltd., Osaka, both of Japan

[21] Appl. No.: 09/079,158

[22] Filed: May 15, 1998

[30] Foreign Application Priority Data

May 16, 1997 [JP] Japan ................................. 9-126887

[51] Int. Cl.$^7$ ............................. C08L 23/14; C08L 23/08; C08L 53/00
[52] U.S. Cl. ....................... 524/451; 524/505; 524/528; 525/88; 525/240; 525/323
[58] Field of Search ............................. 525/323, 88, 240; 504/505, 451

[56] References Cited

U.S. PATENT DOCUMENTS

| | | | |
|---|---|---|---|
| 5,391,618 | 2/1995 | Yamamoto et al. | 525/88 |
| 5,639,816 | 6/1997 | Yamaguchi et al. | 524/451 |
| 5,639,829 | 6/1997 | Yamaguchi et al. | 524/451 |

FOREIGN PATENT DOCUMENTS

| | | |
|---|---|---|
| 6192500 | 7/1994 | Japan . |
| 6192506 | 7/1994 | Japan . |
| 6248156 | 9/1994 | Japan . |
| 7102126 | 4/1995 | Japan . |

*Primary Examiner*—Mark L. Warzel
*Attorney, Agent, or Firm*—Birch, Stewart, Kolasch & Birch, LLP

[57] ABSTRACT

A polypropylene-based resin composition comprising:

(1) 55 to 75% by weight of a polypropylene-based resin (A) selected from the following (i) and (ii);

(i) a crystalline propylene-ethylene block copolymer composed of a propylene homopolymer portion as a first segment and a propylene-ethylene random copolymer as a second segment, and (ii) a mixture of the crystalline propylene-ethylene block copolymer (i) and a crystalline propylene homopolymer;

(2) 10 to 15% by weight of an ethylene-octene copolymer rubber (B) having a melt flow rate (measured according to JIS-K-6758, 190° C.) of 0.5 to 10 g/min., an octene content of 20 to 25% by weight and a density of 0.860 to 0.875; and (3) 15 to 30% by weight of talc (C) having an average particle diameter of not more than 3 μm, the total amount of (A), (B) and (C) being 100% by weight, wherein said polypropylene-based resin composition satisfies the following expression:

$$0.25 \leq (A)'/[(A)'+(B')] \leq 0.40$$

in which (A)' represents an amount by weight of the second segment of the crystalline propylene-ethylene block copolymer (i) in the polypropylene-based resin composition and (B') represents an amount by weight of the ethylene-octene copolymer rubber (B) in the polypropylene-based resin composition, and further has a specific flexural modulus, Izod impact strength, elongation, melt flow rate and density.

12 Claims, No Drawings

POLYPROPYLENE-BASED RESIN COMPOSITION AND INJECTION MOLDED ARTICLE THEREOF

BACKGROUND OF THE INVENTION

1. Field of the Invention

The present invention relates to a polypropylene-based resin composition, which is superior in rigidity and impact resistance in respect of physical properties, and has a short molding cycle in respect of injection moldability and is characterized in that its molded article is excellent in surface quality, for example, the molded article has neither flow mark nor weld line and is free from surface strain. More particularly, it relates to a polypropylene-based resin composition comprising a major amount of a specific polypropylene-based resin, a minor amount of a specific ethylene-octene copolymer rubber and talc, which is superior in physical properties and injection moldability as described above, and an injection-molded article having excellent dimensional stability obtained by subjecting the same to injection-molding, particularly injection-molded article for automobile interior parts (e.g. instrument panel, door-trim, pillar).

2. Prior Art

Crystalline propylene-ethylene block copolymers have recently been used as automobile interior materials in view of lightening and cost saving. However, conventional crystalline propylene-ethylene block copolymer materials had a low impact strength and contained a large amount of an inorganic filler for improving rigidity, thermal properties such as heat distortion temperature and the like. Therefore, the specific gravity was relatively high.

In JP-A-53-22552, 53-22552, 6-192500, 6-248156, 6-192506 or 53-40045, it is disclosed to incorporate an ethylene-propylene copolymer rubber and an ethylene-octene copolymer rubber into a crystalline propylene-ethylene block copolymer to improve the impact strength. However, the rigidity and thermal properties such as heat distortion temperature, etc. for the automobile interior material become inferior because the ethylene-propylene copolymer rubber and ethylene-octene copolymer rubber are incorporated. In JP-A-51-136735, 53-64256, 53-64257, 57-55952, 57-207630, 58-17139, 58-111846 or 59-98157, or JP-B-55-3374, it is disclosed to incorporate an inorganic filler such as calcium carbonate, barium sulfate, mica, crystalline calcium silicate, talc, or the like to improve the rigidity and thermal properties.

In such way, a composition of crystalline propylene-ethylene block copolymer/ethylene-propylene copolymer rubber or ethylene-octene copolymer rubber (abbreviated to "ethylene-propylene or ethylene-octene copolymer rubber composition" hereinafter) has widely been used as the automobile interior material due to its low cost and good moldability. However, it is required to develop a material improved in better balance between impact strength and rigidity by improving the ethylene-propylene copolymer rubber component.

SUMMARY OF THE INVENTION

Under these situations, an object of the present invention is to provide a polypropylene-based resin composition which is superior in balance between impact strength and rigidity to the conventional ethylene-propylene or ethylene-octene copolymer rubber composition, and an injection-molded article thereof.

The present inventors have intensively studied. As a result, the present inventors have found that the polypropylene-based resin composition satisfying the above object of the present invention and its injection-molded article can be obtained by using a polypropylene-based resin as a main component and adding a specific rubber component to this resin at a specific mixing ratio. Thus, the present invention has been completed.

According to the present invention, there is provided a polypropylene-based resin composition comprising:

(1) 55 to 75% by weight of a polypropylene-based resin (A) selected from the following (i) and (ii);

(i) a crystalline propylene-ethylene block copolymer (referred to simply as "propylene-ethylene block copolymer", hereinafter) composed of a propylene homopolymer portion as a first segment and a propylene-ethylene random copolymer as a second segment, and (ii) a mixture of the propylene-ethylene block copolymer (i) and a crystalline propylene homopolymer (referred to simply as "propylene homopolymer", hereinafter);

(2) 10 to 15% by weight of an ethylene-octene copolymer rubber (B) having a melt flow rate at 190° C. (measured according to JIS-K-6758) of 0.5 to 10 g/10 min., octene content of 20 to 25% by weight and density of 0.860 to 0.875 g/cm$^3$; and (3) 15 to 30% by weight of talc (C) having an average particle diameter of not more than 3 μm, wherein the total amount of (A), (B) and (C) is 100% by weight and said polypropylene-based resin composition satisfies the following expression:

$$0.25 \leq (A)'/[(A)'+(B')] \leq 0.40$$

in which (A)' represents an amount by weight of the second segment of the propylene-ethylene block copolymer (i) in the polypropylene-based resin composition and (B') represents an amount by weight of the ethylene-octene copolymer rubber (B) in the polypropylene-based resin composition, and satisfies the following expressions:

$$Y \geq -0.002X+85, X \geq 20000 \text{ and } Y \geq 15$$

in which X (kg/cm$^2$) represents a flexural modulus at 23° C. (measured according to JIS-K-7203) and Y (kg*cm/cm) represents an Izod impact strength at 23° C. (measured according to JIS-K-7110), and wherein the elongation at 23° C. (measured according to ASTM D638) is not less than 150%, the melt flow rate at 230° C. (measured according to JIS-K-6758) is 15 to 25 g/10 min. and the density is from 1.00 to 1.14 g/cm$^3$, and an injection-molded article obtained by injection-molding the above polypropylene-based resin composition.

DETAILED DESCRIPTION OF THE INVENTION

The present invention will be explained in detail below.

In the present invention, the propylene-based resin (A) is (i) a propylene-ethylene block copolymer composed of a propylene homopolymer portion as a first segment and a propylene-ethylene random copolymer portion as a second segment, or (ii) a mixture of the above propylene-ethylene block copolymer (i) and a propylene homopolymer. The content of the propylene homopolymer in the mixture (ii) is preferably 90% by weight or less.

Herein, the propylene-ethylene block copolymer(i) can be obtained by, for example, polymerizing propylene in the presence of a stereoregular olefin polymerization catalyst thereby to obtain a propylene homopolymer portion as the first segment, and subsequently copolymerizing propylene and ethylene thereby to obtain the propylene-ethylene random copolymer portion as the second segment. The propylene-ethylene block copolymer is substantially a composition of the propylene homopolymer portion as the first segment and the propylene-ethylene random copolymer portion as the second segment.

The propylene-ethylene block copolymer can be produced by a slurry polymerization method or a gas phase polymerization method.

Regarding the polypropylene-based resin (A) used in the present invention, the Q value as a ratio of weight average molecular weight(Mw)/number average molecular weight (Mn), which represents a molecular distribution of each of the propylene homopolymer portion of the crystalline propylene-ethylene block copolymer (i) and the crystalline propylene homopolymer according to the gel permeation chromatography (GPC) method, is preferably from 3.0 to 5.0, more preferably from 3.5 to 4.5. When the Q value is less than 3.0, the flowability sometimes becomes inferior. On the other hand, when the Q value exceeds 5.0, preferable results are not sometimes obtained in balance between the rigidity and impact resistance.

The term "propylene homopolymer portion of polypropylene-based resin (A)" refers to both of the first segment portion of the propylene-ethylene block copolymer (i) and the propylene homopolymer, hereinafter.

The isotactic pentad fraction measured by $^{13}$C-NMR of the propylene homopolymer portion of polypropylene-based resin (A) is preferably not less than 0.97, more preferably not less than 0.98. When the isotactic pentad fraction is less than 0.97, it is sometimes difficult to satisfy the desired rigidity, heat resistance, etc.

The intrinsic viscosity [η]P measured in tetralin solution at 135° C. of the propylene homopolymer portion of polypropylene-based resin (A) is preferably 0.9 to 1.8 dl/g, more preferably 0.9 to 1.6 dl/g. When the intrinsic viscosity [η]P is less than 0.9 dl/g, the impact strength the composition obtained sometimes becomes low and good results are not sometimes obtained. On the other hand, when it exceeds 1.8 dl/g, the flowability sometimes becomes inferior.

The propylene homopolymer portion as the first segment of the propylene-ethylene block copolymer (i) to be measured can be obtained by sampling from a polymerization vessel after the polymerization of the propylene homopolymer portion in the first step during its production.

The content of the propylene-ethylene random copolymer portion as the second segment in the propylene-ethylene block copolymer (i) is normally from 5 to 30% by weight, preferably from 10 to 20% by weight.

The ethylene content (C2')EP of the propylene-ethylene random copolymer portion is preferably from 25 to 55% by weight, more preferably from 30 to 50% by weight. When the ethylene content is less than 25% by weight or exceeds 55% by weight, preferable results with respect to the impact resistance of the composition are not sometimes obtained.

The intrinsic viscosity [η]EP of the propylene-ethylene random copolymer portion is preferably from 4.0 to 6.0 dl/g, more preferably from 4.5 to 6.0 dl/g. When the intrinsic viscosity is less than 4.0 dl/g, preferable results are not sometimes obtained in balance between the rigidity and impact resistance. On the other hand, when the intrinsic viscosity exceeds 6.0 dl/g, granule structure is sometimes formed and preferable results are not sometimes obtained in quality of the surface.

Then, the measuring method of the above properties will be described. The isotactic pentad fraction is the fraction of propylene monomer unit existing at the center of the isotactic chain in the form of a pentad unit, in other words, the chain in which five propylene monomer units are successively meso-bonded, in the crystalline polypropylene molecular chain as measured by the method disclosed by A. Zambelli et al. in Macromolecules, 6, 925 (1973), namely by use of $^{13}$C-NMR. However, the assignment of NMR absorption peak is determined according to the method proposed in Macromolecules, 8, 687 (1975) published thereafter.

Specifically, the isotactic pentad fraction is measured as an area fraction of mmmm peak in the total absorption peaks in the methyl carbon region of $^{13}$C-NMR spectrum. When the isotactic pentad fraction of NPL standard substance CRM No. M19-14 Polypropylene PP/MWD/2 of NATIONAL PHYSICAL LABORATORY in U.K. was measured by this method, it was 0.944.

In the propylene-ethylene block copolymer (i), the weight ratio X of the propylene-ethylene random copolymer portion to the total block copolymer can be determined by calculating from the following equations by measuring the quantity of heat of fusion of crystal of each of the crystalline propylene homopolymer portion and total block copolymer:

$$X = 1 - (\Delta Hf)T/(\Delta Hf)P$$

(ΔHf)T: quantity of heat of fusion of total block copolymer (cal/g)

(ΔHf)P: quantity of heat of fusion of crystal of the crystalline propylene homopolymer portion (cal/g)

The ethylene content of the propylene-ethylene random copolymer portion can be determined by measuring the ethylene content (% by weight) of the total block copolymer according to the infrared absorption spectrometry and calculating from the following equation:

$$(C2')EP = (C2')T/X$$

(C2')T: ethylene content of the total block copolymer (% by weight).

(C2')EP: ethylene content of the propylene-ethylene random copolymer portion (% by weight).

Moreover, in the propylene-ethylene block copolymer (i), the intrinsic viscosity [η]EP of the propylene-ethylene random copolymer portion can be determined by measuring each intrinsic viscosity of the homopolymer portion and whole block copolymer and calculating from the following equation.

$$[\eta]EP = [\eta]T/X - (1/X - 1)[\eta]P$$

[η]P: intrinsic viscosity of propylene homopolymer portion (dl/g)

[η]T: intrinsic viscosity of total block copolymer (dl/g)

When used in the use to which the impact resistance is particularly required, the polypropylene-based resin is preferably the propylene-ethylene block copolymer (i).

The ethylene-octene copolymer rubber (B) used in the present invention has a MFR at 190° C. of 0.5 to 10 g/10 min. When the MFR is more than 10 g/10 min., preferable results can not be obtained with respect to the impact strength. When the MFR is less than 0.5 g/10 min., preferable results are not obtained with respect to the impact strength because of poor dispersion with the polypropylene-based resin (A).

In the ethylene-octene copolymer rubber (B), the octene content is from 20 to 25% by weight. When the octene content is less than 20% by weight, good results are not obtained with respect to the impact resistance. On the other hand, when it exceeds 25% by weight, good results are not obtained with respect to the rigidity.

The ethylene-octene copolymer rubber (B) has a density of 0.860 to 0.875 g/cm$^3$. When the density is less than 0.860 g/cm$^3$, the rigidity of the composition becomes poor. On the other hand, when the density exceeds 0.875 g/cm$^3$, the impact resistance of the composition becomes poor.

The ethylene-octene copolymer rubber (B) can be obtained by copolymerizing ethylene with octene in an inert organic solvent such as a hydrocarbon with a Ziegler-Natta catalyst consisting of a vanadium compound and an organoaluminum compound and a halogenated ester compound. It can also be obtained by copolymerizing ethylene with octene using a catalyst comprising a known metallocene compound coordinated in titanium, zirconium or hafnium and an alumoxane, i.e. so-called metallocene catalyst.

The average particle diameter of talc (C) used in the present invention is not more than 3 μm. When the average particle size is more than 3 μm, the impact strength of the composition obtained markedly decreases, and the appearance such as gloss becomes inferior. Talc may be used without subjecting to any treatment, but there can be used those obtained by treating the surface with a surface treating agent selected from silane coupling agents, titanium coupling agents, higher fatty acids, higher fatty acid esters, higher fatty acid amides, higher fatty acid salts and other surfactants, which are normally known as those added for the purpose of improving the interfacial adhesion with the polypropylene-based resin and improving the dispersability.

The average particle diameter of the talc means 50% corresponding particle diameter D50 calculated from the integration distribution curve of an under sieve method measured by suspending talc in a dispersing medium such as water, an alcohol or the like using a centrifugal sedimentation type particle size distribution measuring instrument.

The amount of the talc (C) used is 15 to 30% by weight. When the talc content is less than 15% by weight, the rigidity of the composition becomes low. On the other hand, when the talc content is more than 30% by weight, the impact strength becomes inferior.

In the present invention, the final composition must satisfy the following expression:

$$0.25 \leq \{(A)'/[(A)'+(B')]\} \leq 0.40$$

wherein (A)' represents an amount of the second segment of the propylene-ethylene block copolymer (i) in the polypropylene-based resin composition and (B') represents an amount of the ethylene-octene copolymer rubber (B) in the polypropylene-based resin composition. When the polypropylene-based resin composition does not satisfy the above expression, good results are not obtained with respect to the impact strength.

Furthermore, the final composition must satisfy the following expressions:

$$Y \geq -0.002X + 85, X \geq 20000, \text{ and } Y \geq 15$$

wherein X (kg/cm$^2$) represents a flexural modulus at 23° C. (measured according to JIS-K-7203) and Y (kg*cm/cm) represents an Izod impact strength at 23° C. (measured according to JIS-K-7110). When the final composition does not satisfy the above expressions, good shape as the automobile interior molded article is not obtained.

The tensile elongation of the polypropylene-based resin composition of the present invention is not less than 150%. When the tensile elongation is less than 150%, the brittle fracture is liable to arise and good results as the automobile interior molded article are not obtained.

The MFR at 230° C. of the polypropylene-based resin composition is from 15 to 25 g/10 min. When the MFR is less than 15 g/10 min., the flowability is inferior and, therefore, it becomes difficult to perform molding. On the other hand, when MFR exceeds 25 g/10 min., good results are not obtained with respect to the impact strength.

The density of the polypropylene-based resin composition of the present invention is from 1.00 to 1.14 g/cm$^3$. When the density is not within the above range, good shape as the automobile interior molded article is not obtained.

The composition of the present invention can be produced by using a kneader such as a single screw extruder, twin screw extruder, Banbury mixer, thermal roll or the like. Mixing of each component may be carried out at one time or in several portions. Examples of the method of adding in several portions include a method of kneading a polypropylene-based resin (A) with talc (C), and then adding an ethylene-octene copolymer rubber (B); a method of previously kneading high concentration of talc (C) with a polypropylene-based resin (A) to obtain a master batch and then kneading the master batch with diluting with a polypropylene-based resin(A), or ethylene-octene copolymer rubber (B). As the second method of adding in several portions, there can be preferably used a method of kneading a polypropylene-based resin (A) with an ethylene-octene copolymer rubber (B) and then adding talc (C) to the above polymer mixture, followed by kneading the mixture; and a method of previously kneading an ethylene-octene copolymer rubber (B) into a polypropylene-based (A) at the high concentration to produce a master batch, and then adding a polypropylene-based resin(A) and talc (C) to the master batch, and then kneading the mixture. The third method of adding in several portions includes a method of kneading a polypropylene-based resin (A) and talc (C), and a polypropylene-based resin (A) and an ethylene-octene copolymer rubber (B), respectively, and combining and kneading both mixtures. The temperature required for kneading is normally from 170 to 250° C., and the time is normally from 1 to 20 minutes.

Moreover, it is possible to optionally incorporate additives such as antioxidants, ultraviolet absorbers, lubricants, pigments, anti-static agents, copper harm preventing agents, flame retardants, neutralizing agents, foaming agents, plasticizers, nucleating agents, defoamers, crosslinking agents, etc., in addition to these basic components, in the kneader.

The polypropylene-based resin composition of the present invention can be molded into an injection-molded article by an injection molding which is normally adopted. Particularly, it can be used suitably used as an automobile interior molded article.

The present invention is explained in more detail using the following examples but not limited thereto.

EXAMPLE

The measuring methods of the properties in the Examples are shown below.
(1) Melt Flow Rate (MFR)

It was measured according to JIS K 6758. Unless otherwise stated, the measurement was performed at a temperature of 230° C. under a load of 2.16 kg.
(2) Bending Test It was carried out according to JIS K 7203. A test piece molded by injection molding was used. The thickness of the test piece was 6.4 mm, and the flexural modulus (FM) and flexural strength (FS) were measured under the condition of a span strength of 10 mm and a loading rate of 2.0 mm/min. The measuring temperature was set to 23° C.

(3) Izod Impact Strength

It was measured by the method according to JIS K 7110. A test piece molded by injection molding was used. The thickness of the test piece was 6.4 mm and the impact strength of the test piece with a notch obtained by processing after molding was evaluated. The measuring temperature was set to 23° C.

(4) Tensile Test

It was carried out according to ASTM D638. A test piece obtained by injection molding was used. The thickness of the test piece was 3.2 mm and the stretching rate was 10 mm/min. The ultimate elongation (UE) was evaluated. The measurement was carried out at 23° C.

(5) Ethylene and Propylene Content

The ethylene content or propylene content was determined according to a calibration curve method using absorbance of characteristic absorption of a methyl group or a methylene group, which appear in the infrared absorption spectrum.

(6) Intrinsic Viscosity

The reduced viscosities were measured at three concentrations of 0.1, 0.2 and 0.5 g/dl by using an Ubbelohde viscometer. The intrinsic viscosity was determined by a calculation method described in "Polymer solution, Polymer Experiment, Vol. 11" (published by Kyoritsu Shuppan Co., Ltd, 1982), page 491, i.e. an extrapolation method which comprises plotting the reduced viscosities to the concentrations and extrapolating the viscosity at a concentration to zero. Regarding polypropylene, the intrinsic viscosity of the propylene homopolymer or propylene-ethylene block copolymer was measured at a temperature of 135° C. by using a tetralin as a solvent. The intrinsic viscosity of the ethylene-$\alpha$-olefin copolymer rubber (a) was measured at a temperature of 70° C. by using xylene as a solvent.

(7) Molecular Weight Distribution (Q Value)

It was measured according to gel permeation chromatography (GPC) under the following conditions.

GPC: Model 150C, manufactured by Waters Co.

Column: 2 columns of Shodex 80 MA, manufactured by Showa Denko K.K.

Amount of sample: 300 $\mu$l(polymer concentration: 0.2% by weight)

Flow rate: 1 ml/min.

Temperature: 135° C.

Solvent: o-dichlorobenzene

A calibration curve of the elution volume and the molecular weight was made by using a standard polystyrene manufactured by Tosoh Corporation. Using the calibration curve, the weight-average molecular weight and number-average molecular weight (in terms of polystyrene) of the specimen were determined, and the Q value (=weight average molecular weight (Mw)/number average molecular weight (Mn)) as an index of molecular weight distribution was determined.

Test pieces for evaluation of physical properties of the above items (2), (3), and (4) were made under the following injection molding conditions. After drying the composition at 120° C. for 2 hours in a hot-air dryer, injection molding was carried out by using an injection molding machine (Model IS150E-V, manufactured by Toshiba Machine Co., Ltd.) under the conditions of a molten resin temperature of 220° C., a mold cooling temperature of 50° C., an injection time of 15 seconds and a cooling time of 30 seconds.

Moreover, the following composition was prepared under the following conditions. Polypropylene-based resin (A) and 0.2 parts by weight of aluminum p-tert-butyl-benzoate as a nucleating agent were uniformly premixed in the composition described in Table 3 by using a Henschel mixer and a tumbler, and then the mixture was extruded through a twin-screw kneading extruder (Model: TEX44SS 30BW-2V, manufactured by The Japan Steel Works, Ltd.) under the conditions of an extrusion amount of 30 kg/hour and a screw revolution of 900 rpm. under bent suction.

In addition, abbreviations shown in the tables represent the followings.

BC: Propylene-ethylene block copolymer

PP: Propylene homopolymer

EPR: Ethylene-propylene copolymer rubber

EOR: Ethylene-octene copolymer rubber

P portion: Propylene homopolymer portion in BC or whole PP

EP portion: Propylene-ethylene random copolymer portion in BC

Example 1

A test piece was prepared by injection molding a polypropylene-based resin composition obtained by kneading 50% by weight of a propylene-ethylene block copolymer, 15% by weight of a propylene homopolymer, 14% by weight of an ethylene-octene copolymer rubber (trade name: Engage EG8200, manufactured by Du Pont-Dow Elastomers L.L.C.) and 21% by weight of talc having an average particle diameter of 2.5 $\mu$m under predetermined conditions. The physical properties of various materials are shown in Tables 1 and 2 and the composition proportions are shown in Table 3 and, furthermore, the measurement results of he physical properties are shown in Table 4.

The value of {(A)'/[(A)'+(B)']} in this polypropylene-based resin composition is 0.3.

The value of (−0.002X+85) is 32.0

Comparative Example 1

A test piece was made from a polypropylene-based resin composition obtained by kneading 50% by weight of a propylene-ethylene block copolymer, 15% by weight of a propylene homopolymer, 14% by weight of an ethylene-propylene copolymer rubber and 21% by weight of talc having an average particle diameter of 2.5 $\mu$m under predetermined conditions. The physical properties of various materials are shown in Tables 1 and 2 and the composition proportions are shown in Table 3 and, furthermore, the measurement results of he physical properties are shown in Table 4.

The value of {(A)'/[(A)'+(B)']} in this polypropylene-based resin composition is 0.3.

The value of (−0.002X+85) is 32.4

The composition of Example 1 is superior in flowability and Izod impact strength to that of Comparative Example 1, and is also superior in balance between Izod impact strength and flexural modulus.

TABLE 1

| | P portion | | | EP portion | | |
|---|---|---|---|---|---|---|
| | Q value | [η]P | mmmm | [η]EP (dl/g) | Content 1 (% by weight) | Content 2 (% by weight) |
| BC | 4.0 | 0.9 | 0.98 | 5.0 | 12 | 34 |
| PP | 4.1 | 1.6 | 0.97 | — | — | — |

Content 1: EP portion content in BC
Content 2: ethylene content in EP portion
mmmm: Isotactic pentad fraction

TABLE 2

| Sample | MFR at 190° C. (g/10 min.) | Comonomer content (% by weight) |
|---|---|---|
| EOR | 5 | 24 (octene-1) |
| EPR | 5 | 22 (propylene) |

TABLE 3

| | Composition (% by weight) | | | | |
|---|---|---|---|---|---|
| | BC | PP | EOR | EPR | Talc |
| Example 1 | 50 | 15 | 14 | | 21 |
| Comparative Example 1 | 50 | 15 | | 14 | 21 |

TABLE 4

| | MFR (230° C.) | FM | FS | Izod | UE |
|---|---|---|---|---|---|
| Example 1 | 23 | 26500 | 443 | 38 | 500 |
| Comparative Example 1 | 21 | 26300 | 443 | 27 | 130 |

The polypropylene-based resin composition of the present invention is superior in rigidity and impact strength, and is also superior in flowability. And, the polypropylene-based resin composition of the present invention can be suitably used in an injection molded article by utilizing these physical properties, particularly automobile interior parts.

What is claimed is:

1. A polypropylene-based resin composition comprising:
   (1) 55 to 75% by weight of a crystalline polypropylene-based resin (A) selected from the following (i) and (ii);
   (i) a crystalline propylene-ethylene block copolymer composed of a propylene homopolymer portion as a first segment and a propylene-ethylene random copolymer as a second segment, and
   (ii) a mixture of the propylene-ethylene block copolymer (i) and a crystalline propylene homopolymer;
   (2) 10 to 15% by weight of an ethylene-octene copolymer rubber (B) having a melt flow rate (measured at 190° C. under a load of 2.16 kg according to JIS-K-6758 of 0.5 to 10 g/min., an octene content of 20 to 25% by weight and a density of 0.86 to 0.875 g/cm$^3$; and
   (3) 15 to 30% by weight of talc (C) having an average particle diameter of not more than 3 μm, the total amount of (A), (B) and (C) being 100% by weight, wherein said polypropylene-based resin composition satisfies the following expression:

$$0.25 \leq (A)'/\{(A)'+(B')\} \leq 0.40$$

in which (A)' represents an amount by weight of the second segment of the crystalline propylene-ethylene block copolymer (i) in the polypropylene-based resin composition and (B') represents an amount by weight of the ethylene-octene copolymer rubber (B) in the polypropylene-based resin composition, and satisfies the following expressions:

$$Y \geq -0.002X+85, X \geq 20000 \text{ and } Y \geq 15$$

in which X (kg/cm$^2$) represents a flexural modulus at 23° C. (measured according to JIS-K-7203) and Y (kg*cm/cm) represents an Izod impact strength at 23° C. (measured according to JIS-K-7110), the elongation at 23° C. (measured according to ASTM D638) is not less than 150%, the melt flow rate of 230° C. under a load of 2.16 kg (measured according to JIS-K-6758) is 15 to 25 g/10 min. and the density is 1.00 to 1.14 g/cm$^3$.

2. The polypropylene-based resin composition according to claim 1, wherein the crystalline propylene-ethylene block copolymer has a content of the propylene-ethylene random copolymer portion of 5 to 30% by weight, the propylene homopolymer portion has a Q value of 3.0 to 5.0, an isotactic pentad fraction of not less than 0.97, and an intrinsic viscosity (η)P measured in tetralin solution at 135° C. of 0.9 to 1.8 dl/g, and the propylene ethylene random copolymer portion has an intrinsic viscosity (η)EP of 4.0 to 6.0 dl/g and an ethylene content of 25 to 55% by weight, wherein the intrinsic viscosity (η)EP is a value that is determined by the following expression:

$$(\eta)EP=(\eta)T/X-(1/X-1)(\eta)P(dl/g)$$

(η)P: intrinsic viscosity of propylene homopolymer portion (dl/g) measured in tetralin solution at 135° C.,
(η)T: intrinsic viscosity of total block copolymer (dl/g) measured in tetralin solution at 135° C., and
X: weight ratio of the propylene-ethylene random copolymer portion to the total block copolymer.

3. The polypropylene-based resin composition according to claim 1, wherein the crystalline propylene homopolymer has a Q value of 3.0 to 5.0, an isotactic pentad fraction of not less than 0.97, and an intrinsic viscosity measured in tetralin solution at 135° C. of 0.9 to 1.8 dl/g.

4. The polypropylene-based resin composition according to claim 2, wherein the crystalline propylene-ethylene block copolymer has a content of the propylene ethylene random copolymer portion of 10 to 20% by weight, the propylene homopolymer portion has a Q value of 3.5 to 4.5, an isotactic pentad fraction of not less than 0.98, and an intrinsic viscosity (η)P measured in tetralin solution at 135° C. of 0.9 to 1.6 dl/g, and the intrinsic viscosity (η)EP and ethylene content of the propylene-ethylene random copolymer are 4.5 to 6.0 dl/g and 30 to 50% by weight, respectively.

5. The polypropylene-based resin composition according to claim 3, wherein the crystalline propylene homopolymer has a Q value of 3.5 to 4.5, an isotactic pentad fraction of not less than 0.98, and an intrinsic viscosity measured in tetralin solution at 135° C. of 0.9 to 1.6 dl/g.

6. An injection molded article obtained by subjecting the polypropylene-based composition of claim 1 to injection molding.

7. The injection molded article according to claim 6, which is for automobile interior parts.

8. The polypropylene-based resin composition according to claim 2, wherein the crystalline propylene homocopolymer has a Q value of 3.5 to 4.5.

9. The polypropylene-based resin composition according to claim 2, wherein the isotactic pentad fraction is not less than 0.98.

10. The polypropylene-based resin composition according to claim 2, wherein the intrinsic viscosity $(\eta)P$ is 0.9 to 1.6 dl/g.

11. The polypropylene-based resin composition according to claim 2, wherein the crystalline propylene-ethylene block copolymer has a content of the propylene-ethylene random copolymer portion of 10 to 20% by weight.

12. The polypropylene-based resin composition according to claim 2, wherein the intrinsic viscosity $(\eta)EP$ is 4.5 to 6.0 dl/g.

* * * * *